(12) United States Patent
Ikari et al.

(10) Patent No.: US 6,618,196 B2
(45) Date of Patent: Sep. 9, 2003

(54) REAR-PROJECTION TYPE SCREEN

(75) Inventors: Tokuo Ikari, Chuo-ku (JP); Ichiro Matsuzaki, Chuo-ku (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/846,306

(22) Filed: May 2, 2001

(65) Prior Publication Data

US 2001/0040729 A1 Nov. 15, 2001

(30) Foreign Application Priority Data

May 10, 2000 (JP) ........................................ 2000-137287

(51) Int. Cl.⁷ ........................... G03B 21/56; G03B 21/60
(52) U.S. Cl. ........................................ 359/457; 359/460
(58) Field of Search .................................. 359/449, 450, 359/456, 457, 460

(56) References Cited

U.S. PATENT DOCUMENTS

| | | | | |
|---|---|---|---|---|
| 5,803,567 A | * | 9/1998 | Nakanishi | 359/457 |
| 6,275,334 B1 | * | 8/2001 | Park | 359/449 |
| 6,317,263 B1 | * | 11/2001 | Moshrefzadeh et al. | 359/460 |
| 6,348,993 B1 | * | 2/2002 | Hori | 359/460 |
| 6,407,859 B1 | * | 6/2002 | Hennen et al. | 359/457 |

FOREIGN PATENT DOCUMENTS

| | | |
|---|---|---|
| JP | 1-97327 | 6/1989 |
| JP | 1-142901 | 9/1989 |
| JP | 2-93531 | 4/1990 |

* cited by examiner

*Primary Examiner*—Christopher Mahoney
(74) *Attorney, Agent, or Firm*—Oblon, Spivak, McClelland, Maier & Neustadt, P.C.

(57) ABSTRACT

To provide a rear-projection type screen in which, without the need for a tape-attachment operation on the outer circumferential part of the lens sheets, the top of the Fresnel lens can be prevented from being pared by the abrasion caused by the vibration during transportation. A rear-projection type screen according to the present invention is configured from two or more overlapping sheet-like members such as a Lenticular lens sheet 1 and Fresnel lens sheet 2, in which a fixing protrusion 3 is integrally formed in the sheet-like members in such way that neither of the two sheet-like members is displaced from the state in which the two sheet-like members overlap. A protrusion, used to attach the rear-projection type screen to the main body of a rear-projection-type image display apparatus or the screen frame, may be integrally formed in the sheet-like members from which the rear-projection type screen is configured. In addition, a protrusion, which produces a gap between the top of a lens in one of the sheet-like members and the other sheet-like member in a state in which the two sheet-like members overlap, may be integrally formed in the sheet-like members.

16 Claims, 7 Drawing Sheets

REAR-PROJECTION TYPE SCREEN

BACKGROUND OF THE INVENTION

1. Field of the Invention

The present invention relates to a rear-projection type screen employed in a rear-projection type television set.

2. Description of the Related Art

Figure 10:
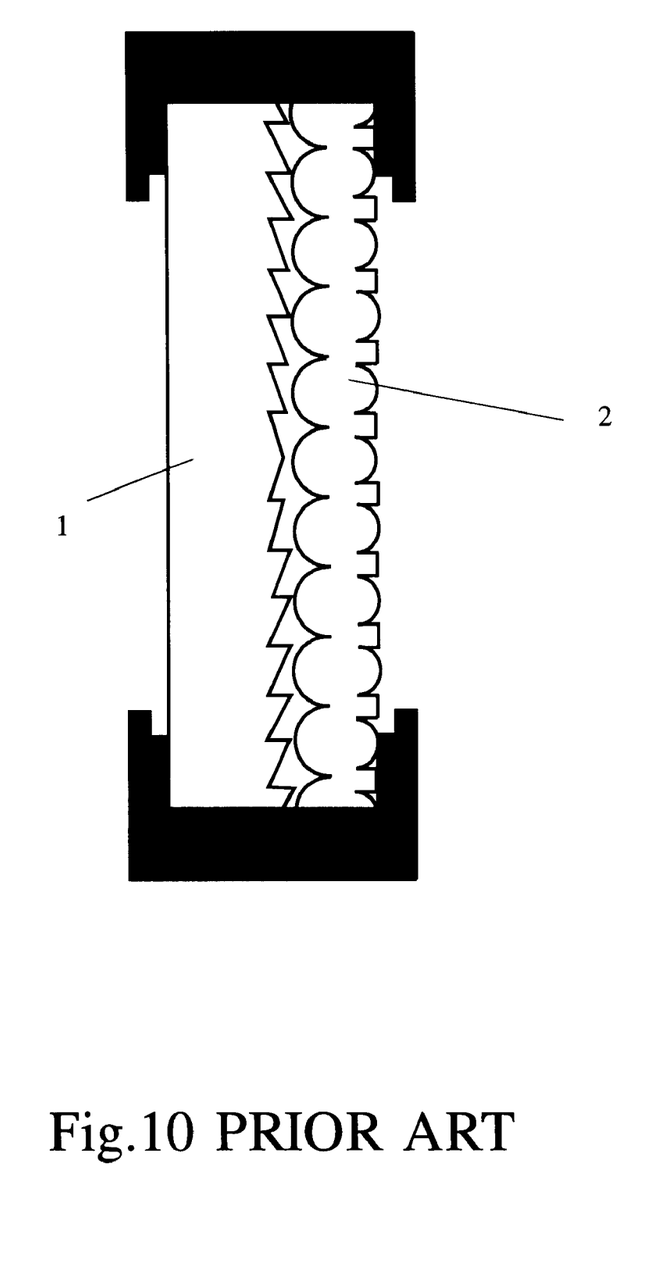
FIG. 10 is a schematic diagram of a rear-projection type screen of the prior art employed in a rear-projection type television set.
Figure 11:
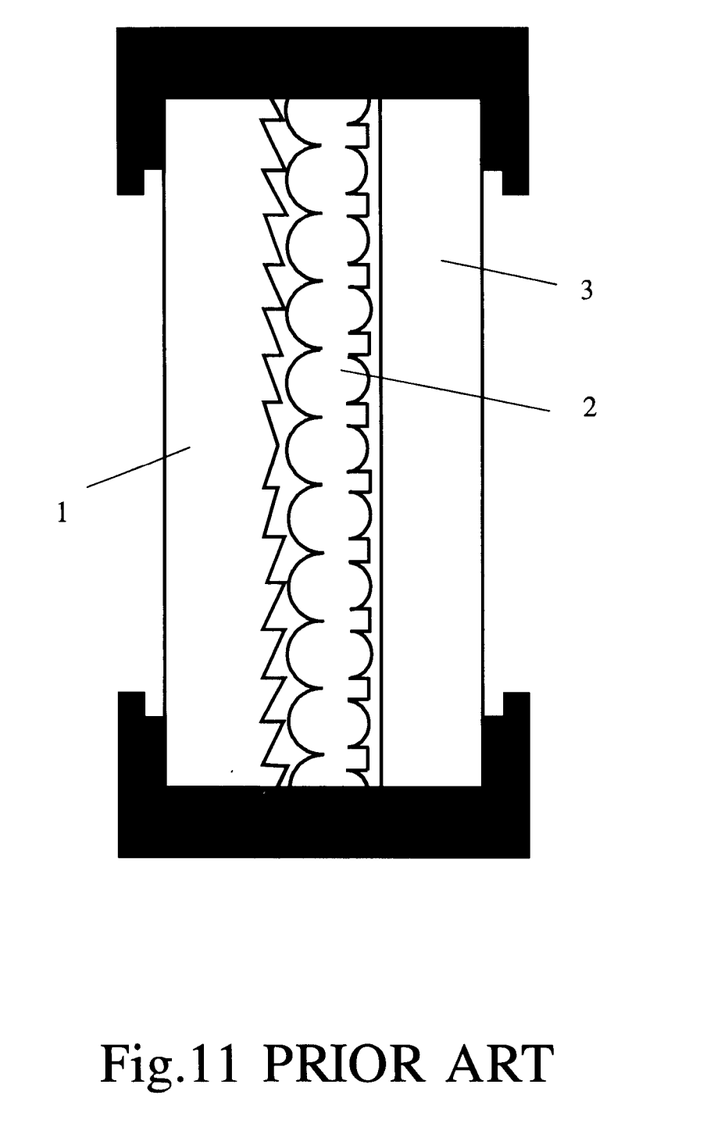
FIG. 11 is a schematic diagram of a rear-projection type screen of the another prior art employed in a rear-projection type television set.

Examples of well-known rear-projection type screens of the prior art employed in rear-projection type television sets include, as shown in FIG. 10, a 2-sheet type in which a Lenticular lens sheet 1 and Fresnel lens sheet 2 are combined, and as shown in FIG. 11, a 3-sheet-type in which a Lenticular lens sheet 1, Fresnel lens sheet 2 and front plate 3 are combined. In these rear-projection type screens of the prior art—in which 2 or more plastic lenses of different thickness and material quality are combined—gaps, which have their origin in the difference in magnitude of the elongation and shrinking of the constituent members (lens sheets or front plate) with respect to changes in temperature and humidity of the surrounds, are generated between the constituent members. For this reason, rear-projection type screens (by way of example in Japanese Unexamined Utility Model Application No. Heisei 1-142901) have been configured in which, in the manufacturing stage of the lens sheets, warp is imparted in advance by the mounting of a flat surface lens sheet in a mold and the heating thereof in this state, the elastic forces of the lens sheets are utilized to closely attach the lens sheets, and the lens sheets are fixed in the screen frame in such a way that no gaps are formed.

When a television set comprising a rear-projection type screen, in which lens sheets and a front plate are fixed in the projection sheet frame, is transported for a long time, abrasion between the lens sheets occurs which is caused by vibration during transportation. As a result, the top of the Fresnel lens and the top of the Lenticular lens are pared, or the rear surface of the front plate is pared, whereby the problem of a significant reduction in television set image quality is generated. Generally, in the state in which the screen is being used, the paring of the top of the Fresnel lens and the like is generated mostly in the region of the upper and lower edge parts.

In order to solve this problem of the paring of the top of the Fresnel lens and so on, a screen in which the sharpened section of the top of the Fresnel lens is flattened (see Japanese Unexamined Patent Application No. Heisei 2-93531), and a screen in which the macroscopic cross-sectional shape of the Lenticular lens sheet is formed to approximate a spherical shape in which the curved lines and straight lines are combined (Japanese Unexamined Utility Model Application No. Heisei 1-97327), have been proposed.

However, in order for the image quality not to be reduced for screens in which the top of the Fresnel lens has been flattened, there are limits that only a minute section of the top of the Fresnel lens, whose width of the top may be only several μm and through which the projected light does not pass must be flattened, while the shape of the other section through which the projected light passes must not be altered. For this reason, the prevention effect on the paring caused by the abrasion of the lens sheets is inadequate. In addition, in a Fresnel lens sheets for rear-projection type screens, the above-mentioned flat part of the top of the Fresnel lens which have concentric graves cannot be provided selectively in just the upper and lower edge regions of the screen through manufacturing process employing a metal mold for the lens sheet produced by cutting each single groove with a cutting tool. Thereupon, a problem arises in that the cutting must be performed to a region, from the left and right edges of the screen, in which the provision of the flat part in the top of the lens is unnecessary.

On the other hand, in a screen in which the macroscopic cross-sectional shape of the Lenticular lens sheet is an approximately spherical shape in which the curved lines and straight lines are combined, gaps are generated between both lens sheets in a region in which the macroscopic cross-sectional shape of the Lenticular lens sheet constitutes a straight line shape in environments of high temperature and the like. When the size of the warp is enlarged to solve this problem, a paring of the top and so on of the Fresnel lens is liable to occur due to the abrasion of the sheet at a region in which the macroscopic cross-sectional shape of the lens sheet constitutes a curved line shape. For this reason, it is difficult to remove the problems of elimination of the gap between the sheets and prevention of paring of the top and so on of the Fresnel lens simultaneously.

In addition, in order to prevent the paring of the top of the Fresnel lens and so on due to the abrasion caused by vibration during transportation, the attachment of a tape to the outer circumferential part of the lens sheets or front plate has been performed by operators. However, there are times when the lens is damaged during the application of the tape, because this operation is complicated.

SUMMARY OF THE INVENTION

In view of the foregoing, it is an object of the present invention to prevent the paring of the top of the Fresnel lens and so on due to the abrasion caused by the vibration during transportation without the need for a tape attachment operation on the outer circumferential part of the lens sheets and so on in a rear-projection type screen which is configured by the combination of a Fresnel lens sheet and Lenticular lens sheet and so on.

According to one aspect of the present invention, for achieving the above-mentioned object, there is provided a rear-projection type screen configured from two or more overlapping sheet-like members, including a fixing protrusion integrally formed in the sheet-like member in such way that neither of the two sheet-like members is displaced from the state in which the two sheet-like members overlap. The rear-projection type screen is configured from, by way of example, (1) two sheet-like members comprising a Lenticular lens sheet and a Fresnel lens sheet, or (2) three sheet-like members comprising a Lenticular lens sheet, a Fresnel lens sheet and front plate. Consequently, the sheet-like members from which rear-projection screen is configured further include a protrusion which is integrally formed in the sheet-like members, used to attach the rear-projection screen to the main body of a rear-projection image display apparatus or to a screen frame. The above-mentioned attachment protrusion may be integrally formed independently without the provision of the above-mentioned fixing protrusion in the sheet-like member from which the rear-projection screen is configured. Further, a protrusion may be integrally formed in the sheet-like member for the purpose of generating a gap between the front end section of the lens in one of the sheet-like members and the other sheet member when the two sheet-like members overlap. This gap may be of a magnitude to allow the front end section of the lens in one of the sheet-like members comes into partial contact with the other sheet-like member. The above-mentioned three protrusions are provided outside the effective region of the image range.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DIAGRAMS

DESCRIPTION OF THE PREFERRED EMBODIMENTS

Figure 1:
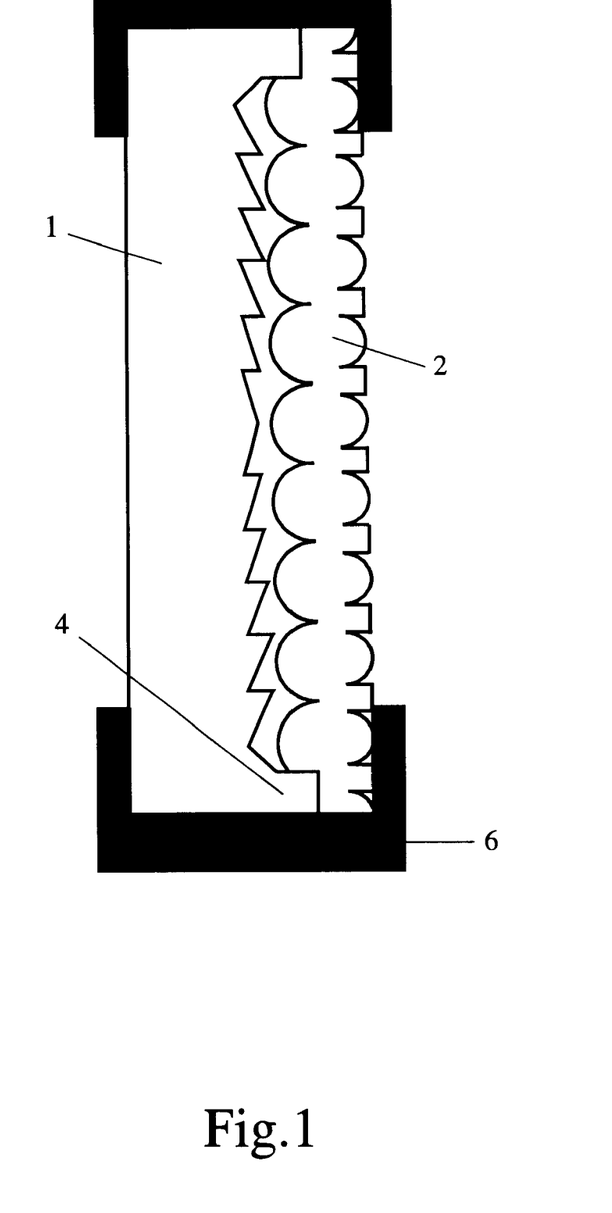
FIG. 1 is a perspective view that shows one example of the rear-projection type screen according to the present invention.
Figure 2:
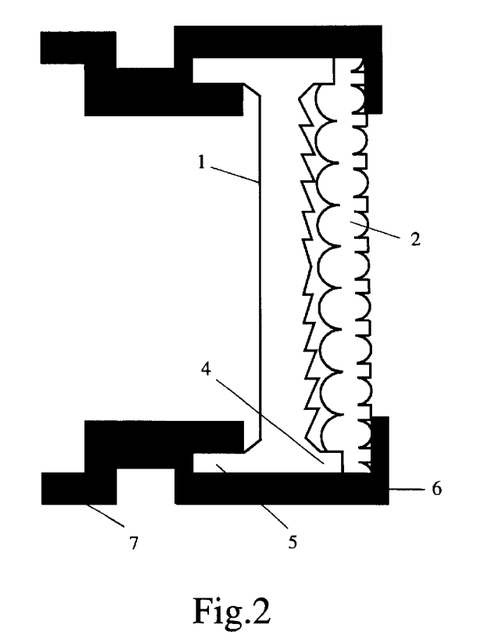
FIG. 2 is a perspective view that shows another example of the rear-projection type screen according to the present invention.

A schematic diagram of one example of a rear-projection type screen according to the present invention is shown in FIG. 1 and FIG. 2. The rear-projection type screen shown in FIG. 1 comprises a Fresnel lens sheet 1 and a Lenticular lens sheet 2, and a protrusion 4 is integrally formed in the Fresnel lens sheet 1 at the Lenticular lens sheet 2 side of a region outside the image range. As shown in FIG. 1, a hollow place correspondent to the protrusion 4 is formed in the Lenticular lens sheet 2 at the Fresnel lens sheet 1 side. By the fitting of the protrusion 4 of the Fresnel lens sheet 1 into the hollow place of the Lenticular lens sheet 2 both are fixed. As a result, the tape attachment operation in the outer circumferential part of both sheets is unnecessary. The rear-projection type screen shown in FIG. 2 comprises a Fresnel lens sheet 1, a Lenticular lens sheet 2 and a protrusion 4, which is integrally formed in the Fresnel lens sheet 1 at the Lenticular lens sheet 2 side of a region outside the image range, for fixing both lens sheets. The rear-projection type screen shown in FIG. 2 further comprises a protrusion 5, which is provided in the Fresnel lens sheet 1 at the rear side of region outside the image range, for fixing in a screen frame 6 and an attachment part 7 for the main body of rear-projection type image display apparatus. The fixing protrusion 5 may be fixed to just either the screen frame 6 or the attachment part 7 for the main body of the rear-projection type image display apparatus. It is preferable that the above-noted two protrusions 4, 5 shown in FIG. 2 be formed of a material which is the same as the material for the main body section of the lens sheets. In the case in which different materials are employed for the protrusion and the main body section, there is a possibility that a peeling will occur at the interface of the different materials and, by the differences in thermal expansion and water absorption a waviness or wrinkles will be occurred.

Figure 3:
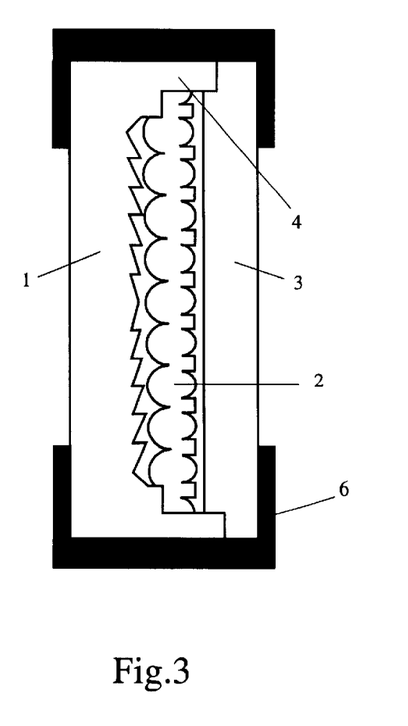
FIG. 3 is a perspective view that shows another example of the rear-projection type screen according to the present invention.
Figure 4:
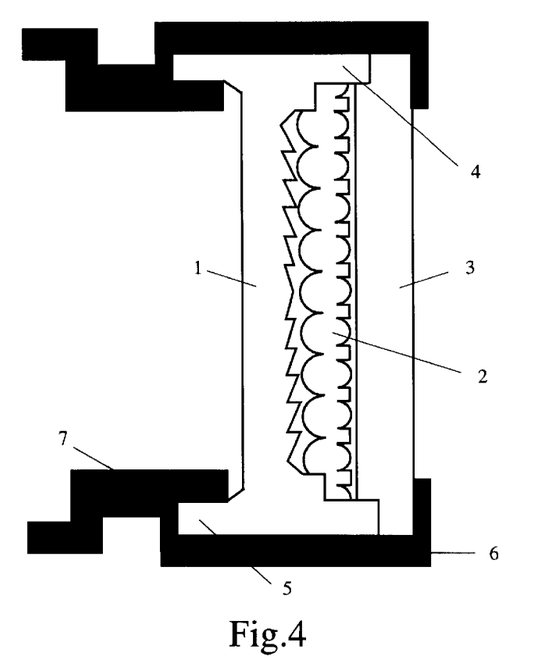
FIG. 4 is a perspective view that shows another example of the rear-projection type screen according to the present invention.

Schematic diagrams of another example of a rear-projection type screen based on the present invention are shown in FIG. 3 and FIG. 4. The rear-projection type screen shown in FIG. 3 and FIG. 4 comprises a Fresnel lens sheet 1, Lenticular lens sheet 2 and front plate 3. In the rear-projection type screen shown in FIG. 3, a fixing protrusion 4 is integrally formed in the Fresnel lens sheet 1 in such a way that the Fresnel lens sheet 1, Lenticular lens sheet 2 and front plate 3 are not displaced. In the rear-projection type screen shown in FIG. 4, a fixing protrusion 4, such that the Fresnel lens sheet 1, Lenticular lens sheet 2 and front plate 3 are not displaced, and a protrusion 5, used for attachment to screen frame 6 and an attachment part 7 of the rear-projection type image display apparatus main body, are integrally formed in the Fresnel lens sheet 1.

Figure 5:
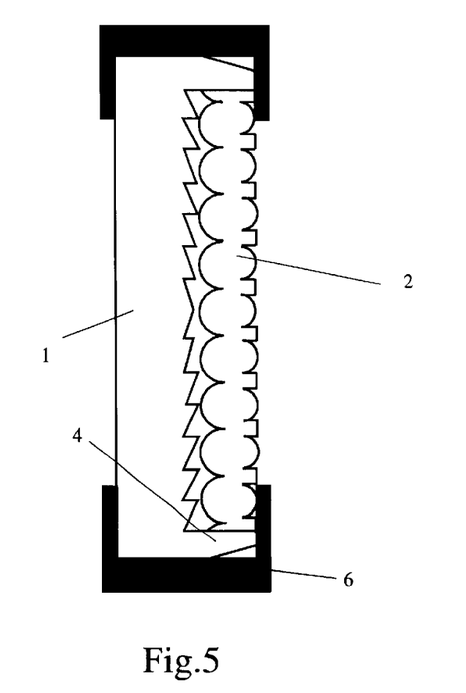
FIG. 5 is a perspective view that shows another example of the rear-projection type screen according to the present invention.
Figure 6:
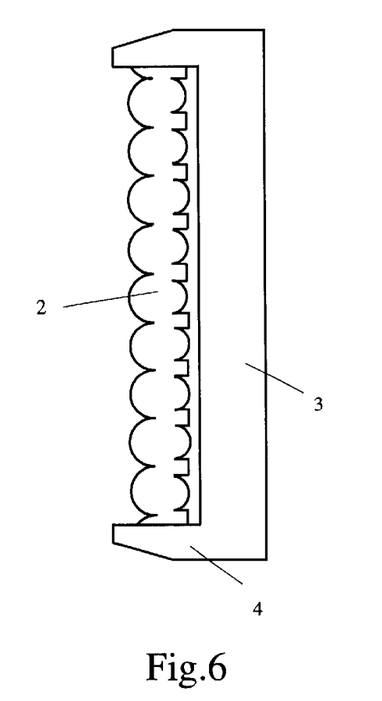
FIG. 6 is a perspective view that shows another example of the rear-projection type screen according to the present invention.

Although a hollow place of the rear projection screen shown in FIGS. 1 to 4 is provided in the Lenticular lens sheet 2 which is correspondent to the protrusion 4 of the Fresnel lens sheet 1 and, as shown in FIG. 5, the whole of the Lenticular lens sheet 2 may be fitted in the Fresnel lens sheet 1 without a hollow place being used in the Lenticular lens sheet 2. Also the whole of the Lenticular lens sheet 2 may be inserted in a front plate 3 in which a protrusion 4 is provided at the both edges of the front plate 3 as shown in FIG. 6.

Figure 7:
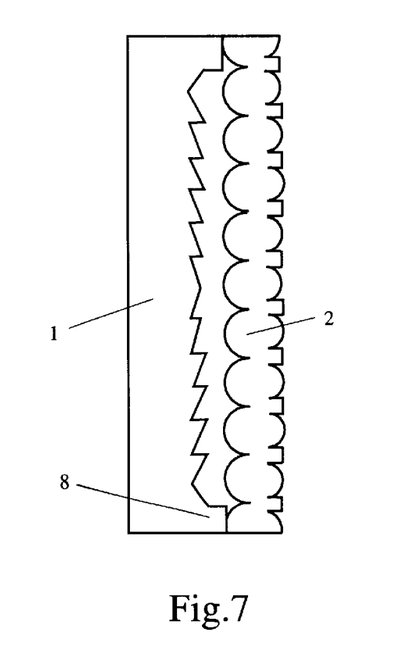
FIG. 7 is a perspective view that shows another example of the rear-projection type screen according to the present invention.
Figure 8:
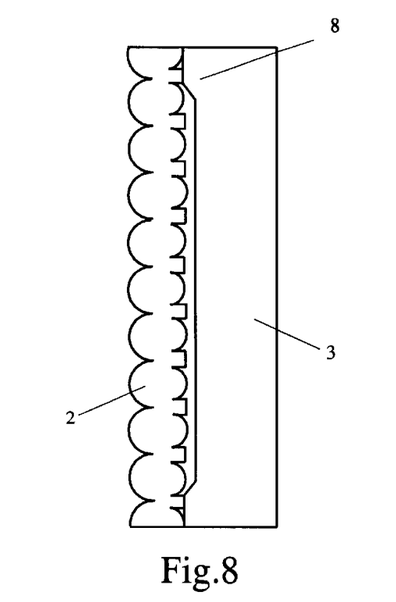
FIG. 8 is a perspective view that shows another example of the rear-projection type screen according to the present invention.

Schematic diagrams of another example of a rear-projection type screen based on the present invention are shown in FIG. 7 and FIG. 8. In the rear-projection type screen shown in FIG. 7, a protrusion 8, which produces a gap between the top of the lens of both lens sheets in a state in which the Fresnel lens sheet 1 and Lenticular lens sheet 2 overlap, is provided in the Fresnel lens sheet 1. In the rear-projection type screen shown in FIG. 8, a protrusion 8, which produces a gap between the top of the lens of the Lenticular lens sheet 2 and the front plate 3 in a state in which the Lenticular lens sheet 2 and front plate 3 overlap, is provided in the front plate 3. It is preferable that the gap be 0.1 mm or above. However, because the resolution of the projected image is worsened as the magnitude of this level difference increases, it is preferable that the gap be 2.0 mm or less.

The Fresnel lens sheet can be formed by injection-molding using, for example, an acrylic resin, polycarbonate resin, a polyolefine resin, a polystylene resin, and a thermoplastic elastomer resin or a copolymer resin of these. In addition, the Fresnel lens sheet can be molded by a press-molding method and a photo-polymerization method in which an ultraviolet cured resin is employed. The Lenticular lens sheet can be molded by, for example, extrusion-molding in which an acrylic resin is employed. The above-mentioned 3 types of protrusions can be molded by the advance-processing, in a metal mold employed in injection-molding or a stamper which is used together with the metal mold, of an inverse mold for the protrusion.

Figure 9:
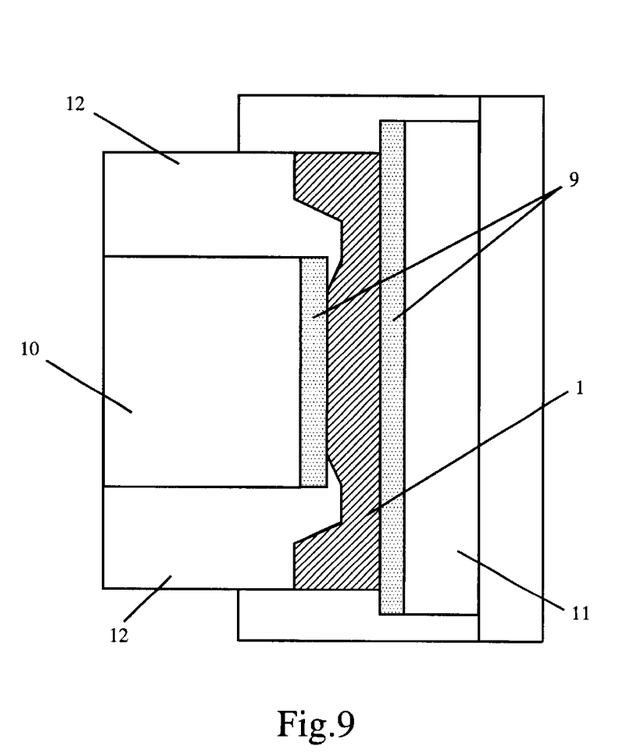
FIG. 9 is a schematic diagram of one example of an injection molder used for the molding of the Fresnel lens sheet by an injection-molding method.

An example of an injection molder used for the molding of the Fresnel lens sheet 1 by an injection-molding method is shown in FIG. 9. In the injection-molding method, a stamper 9 is attached to a fixed mirror 10 side and movable mirror 11 side. The stamper 9 is attached using a stamper holder 12 to the fixed mirror surface 10 side. The shape of the protrusion formed in the Fresnel lens sheet 1 is determined by the shape of the stamper holder 12, and the shape of the stamper holder 12 should be changed in accordance with the protrusion which is to be formed in the Fresnel lens sheet 1.

Based on the present invention, a rear-projection type screen can be provided in which, without the need for a tape attachment operation on the outer circumferential part of the lens sheets and so on, the paring of the top of the Fresnel lens and so on due to the abrasion caused by the vibration during transportation can be prevented.

While preferred embodiments of the present invention have been described using specific terms, such description is for illustrative purposes only, and it is to be understood that changes and variations may be made without departing from the spirit or scope of the following claims.

What is claimed is:

1. A rear-projection type screen comprising:
   two or more overlapping sheet-like members, wherein an entirety of length of a first overlapping sheet-like member of the two or more overlapping sheet-like members is fitted between first and second protrusions, the first and second protrusions being integrally formed to protrude from extreme opposite ends of a second overlapping sheet-like member of the two or more overlapping sheet-like members in order that the first overlapping sheet-like member of the two or more overlapping sheet-like members is fixed to the second overlapping sheet-like member of the two or more overlapping sheet-like members without being displaced.

2. The rear-projection type screen according to claim 1, wherein the two or more overlapping sheet-like members is exactly two overlapping sheet-like members being the first overlapping sheet-like member and the second overlapping sheet-like member, the first overlapping sheet-like member being a Lenticular lens sheet and the second overlapping sheet-like member being a Fresnel lens sheet.

3. The rear-projection type screen according to claim 1, wherein the two or more overlapping sheet-like members is three overlapping sheet-like members being a first overlapping sheet-like member, a second overlapping sheet-like member, and a third overlapping sheet-like member, the first overlapping sheet-like member being a Lenticular lens sheet, the second overlapping sheet-like member being a Fresnel lens sheet, and the third overlapping sheet-like member being a front plate.

4. The rear-projection type screen according to claim 1, wherein a material of the protrusion is a same material as that of the second overlapping sheet-like member of the two or more overlapping sheet-like members on which the protrusion is formed.

5. The rear-projection type screen according to claim 1, wherein the protrusion is formed to protrude from the second overlapping sheet-like member of the two or more overlapping sheet-like members at a region outside of an image range.

6. A rear-projection type screen comprising:
   two or more overlapping sheet-like members selected from a group consisting of a Fresnel lens sheet, a Lenticular lens sheet, and a front plate; and
   a protrusion configured to attach the rear-projection type screen to a main body of a rear-projection type image display apparatus, the protrusion being integrally formed on one of the Fresnel lens sheet, the Lenticular lens sheet, and the front plate which have been selected from the group to constitute the two or more overlapping sheet-like members.

7. The rear-projection type screen according to claim 2, wherein the two or more overlapping sheet-like members is exactly two overlapping sheet-like members being the first overlapping sheet-like member and the second overlapping sheet-like member, the first overlapping sheet-like member being the Lenticular lens sheet and the second overlapping sheet-like member being the Fresnel lens sheet.

8. The rear-projection type screen according to claim 6, wherein the two or more overlapping sheet-like members is three overlapping sheet-like members being the first overlapping sheet-like member, the second overlapping sheet-like member, and a third overlapping sheet-like member, the first overlapping sheet-like member being the Lenticular lens sheet, the second overlapping sheet-like member being the Fresnel lens sheet, and the third overlapping sheet-like member being the front plate.

9. The rear-projection type screen according to claim 6, wherein a material of the protrusion is a same material as that of the second overlapping sheet-like member of the two or more overlapping sheet-like members on which the protrusion is formed.

10. The rear-projection type screen according to claim 6, wherein the protrusion is formed to protrude from the second overlapping sheet-like member of the two or more overlapping sheet-like members at a region outside of an image range.

11. A rear-projection type screen comprising:
    two or more overlapping sheet-like members selected from a group consisting of a Fresnel lens sheet, a Lenticular lens sheet, and a front plate; and
    a protrusion configured to produce a gap between a front end of a lens on a first overlapping sheet-like member of the two or more overlapping sheet-like members and a second overlapping sheet-like member of the two or more overlapping sheet-like members in a state in which the first and second overlapping sheet-like members of the two or more overlapping sheet-like members overlap, the protrusion being integrally formed in one of the Fresnel lens sheet, the Lenticular lens sheet, and the front plate which have been selected from the group to constitute the two or more overlapping sheet-like members,
    wherein the protrusion is formed to protrude from the second overlapping sheet-like member of the two or more overlapping sheet-like members at a region outside of an image range, and
    wherein the gap has a length which is within a range of equal to or greater than 0.1 mm and equal to or less than 2.0 mm.

12. The rear-projection type screen according to claim 11, wherein the two or more overlapping sheet-like members is exactly two overlapping sheet-like members being the first overlapping sheet-like member and the second overlapping sheet-like member, the first overlapping sheet-like member being the Lenticular lens sheet and the second overlapping sheet-like member being the Fresnel lens sheet.

13. The rear-projection type screen according to claims 11, wherein the two or more overlapping sheet-like members is three overlapping sheet-like members being the first overlapping sheet-like member, the second overlapping sheet-like member, and a third overlapping sheet-like member, the first overlapping sheet-like member being the Lenticular lens sheet, the second overlapping sheet-like member being the Fresnel lens sheet, and the third overlapping sheet-like member being the front plate.

14. The rear-projection type screen according to claim 11, wherein a material of the protrusion is a same material as that of the second overlapping sheet-like member of the two or more overlapping sheet-like members on which the protrusion is formed.

15. A rear-projection type screen comprising:

two or more overlapping sheet-like members selected from a group consisting of a Fresnel lens sheet, a Lenticular lens sheet, and a front plate;

a protrusion configured to attach the rear-projection type screen to either a main body of a rear-projection type image display apparatus or to a screen frame of the rear-projection type screen, the protrusion being integrally formed on one of the Fresnel lens sheet, the Lenticular lens sheet, and the front plate which have been selected from the group to constitute the two or more overlapping sheet-like members; and a second protrusion configured to protrude from the Fresnel lens sheet to fix the Fresnel lens sheet to the Lenticular lens sheet, the Lenticular lens sheet having a hollow place which is fitted by the second protrusion.

16. A rear-projection type screen comprising:

three overlapping sheet-like members, wherein a first sheet-like member of the three overlapping sheet-like members has a hollow place, a second sheet-like member of the three overlapping sheet-like members is placed between the first sheet-like member of the three overlapping sheet-like members and a third sheet-like member of the three overlapping sheet-like members; and a protrusion which is fitted in the hollow place in the first sheet-like member of the three overlapping sheet-like members to entirely fit the second sheet-like member of the three overlapping sheet-like members between the first sheet-like member and the third sheet-like member, the protrusion being integrally formed to protrude from the third sheet-like member.

* * * * *